(12) United States Patent
Tang et al.

(10) Patent No.: US 8,938,171 B2
(45) Date of Patent: Jan. 20, 2015

(54) SYNCHRONIZATION PROCESS IN OPTICAL FREQUENCY DIVISION MULTIPLEXING TRANSMISSION SYSTEMS

(75) Inventors: Jianming Tang, Harlow Essex (GB); Xianqing Jin, Bangor Gwynedd (GB)

(73) Assignee: Bangor University, Bangor Gwynedd (GB)

( * ) Notice: Subject to any disclaimer, the term of this patent is extended or adjusted under 35 U.S.C. 154(b) by 140 days.

(21) Appl. No.: 13/504,697

(22) PCT Filed: Oct. 29, 2010

(86) PCT No.: PCT/EP2010/066471
§ 371 (c)(1),
(2), (4) Date: May 24, 2012

(87) PCT Pub. No.: WO2011/051448
PCT Pub. Date: May 5, 2011

(65) Prior Publication Data
US 2012/0230686 A1   Sep. 13, 2012

(30) Foreign Application Priority Data

Oct. 30, 2009 (GB) .................................. 0919057.0
May 18, 2010 (EP) ..................................... 10163169

(51) Int. Cl.
*H04B 10/00* (2013.01)
*H04L 27/26* (2006.01)

(52) U.S. Cl.
CPC ........ *H04L 27/2662* (2013.01); *H04L 27/2697* (2013.01); *H04L 27/2678* (2013.01)
USPC .......................................... 398/135; 398/136

(58) Field of Classification Search
None
See application file for complete search history.

(56) References Cited

U.S. PATENT DOCUMENTS

| | | | |
|---|---|---|---|
| 5,555,833 A | 9/1996 | Schramayr et al. | |
| 5,953,311 A | 9/1999 | Davies et al. | |
| 6,359,938 B1 * | 3/2002 | Keevill et al. | 375/316 |
| 7,706,488 B2 * | 4/2010 | Chen et al. | 375/354 |
| 2003/0142764 A1 | 7/2003 | Keevill et al. | |
| 2004/0208269 A1 | 10/2004 | Chen et al. | |
| 2005/0276340 A1 | 12/2005 | Chow et al. | |
| 2006/0239179 A1 * | 10/2006 | Berkeman et al. | 370/208 |

FOREIGN PATENT DOCUMENTS

| | | |
|---|---|---|
| EP | A-840485 | 5/1998 |
| EP | A-1296493 | 3/2003 |
| GB | 2353680 | 2/2001 |
| WO | WO98/19410 | 5/1998 |

OTHER PUBLICATIONS

Kaneda et al., Realizing real-time inplementation of coherent optical OFDM receiver with FPGAs, 35th European Conference on optical Communicaiton, Sep. 2009, IEEE, pp. 1-4.*

(Continued)

*Primary Examiner* — Li Liu
*Assistant Examiner* — Jai Lee
(74) *Attorney, Agent, or Firm* — RatnerPrestia

(57) ABSTRACT

The present invention discloses a synchronization method suitable for increasing the receiving speed in the receiving part of an orthogonal optical frequency division multiplexing (OOFDM) transceiver.

10 Claims, 10 Drawing Sheets

(56) References Cited

OTHER PUBLICATIONS

Jin et al., First experimental demonstration of end-to-end real-time optical OFDM symbol synchronization using subtraction and Gaussian windowing in 25Km SMF IDD systems, Sep. 2010, IEEE, pp. 1-3.*

International Search Report for PCT/EP2010/066471 mailed Apr. 19, 2011.

Kaneda et al.: "Realizing real-time implementation of coherent optical OFDM receiver with FPGAs" $35^{th}$ European Conf. on Optical Communication, 2009. ECOC '09, Vienna, Austria, IEEE, Piscataway, NJ, USA, Sep. 2009, pp. 1-4, XP031546369. ISBN: 978-1-4244-5096-1.

Jin et al.: "First experimental demonstration of end-to-end real-time optical OFDM symbol synchronization using subtraction and Gaussian windowing in 25 km SMF IMDD systems," Optical Communication (ECOC), 2010 $36^{th}$ European Conf. and Exhibition on, IEEE, Piscataway, NJ, USA, Sep. 19, 2010, pp. 1-3, XP031789970, ISBN: 978-1-4244-8536-9.

N.E. Jolley et al.: "Generation and propagation of a 1550 nm 10 Gbit/s Optical Orthogonal Frequency Division Multiplexed signal over 1000m of Multimode fibre using a directly modulated DFB," presented at the National Fibre Optical Fibre Engineers Conf., Annaheim, CA, Mar. 11, 2005, Paper OFP3.

A.J. Lowery et al.: "Orthogonal Frequency Division Multiplexing for Adaptive Dispersion Compensation in Long Haul WDM Systems," presented at the National Fibre Optical Fibre Engineers Conf., Annaheim, CA, Mar. 5, 2006, paper PDP39.

I.B. Djordjevic and B. Vasic: "Orthogonal frequency division multiplexing for high-speed optical transmission," in Optics Express, 14, No. 9, pp. 3767-3775, 2006.

H. Masuda et al.: "13.5-Tb/s (135×111-Gb/s/ch) no-guard-interval coherent OFDM transmission over 6,248km using SNR maximized second-order DRA in the extended L-band," Optical Fibre Communication/National Fibre Optic Engineers Conf. (OFC/NFOEC), (OSA, 2009), Paper PDPB5.

B.J.C. Schmidt et al.: "100 Gbit/s transmission using single-band direct-detection optical OFDM," Optical Fibre Communication/National Fibre Optic Engineers Conf. (OFC/NFOEC) (OSA, 2009), Paper PDPC3.

T. Duong et al., "Experimental demonstration of 10 Gbit/s for upstream transmission by remote modulation of 1 GHz RSOA using Adaptively Modulated Optical OFDM for WDM-PON single fiber architecture," European Conf. on Optical Communication (ECOC), (Brussels, Belgium, 2008), PD paper Th.3.F.1.

C.W. Chow et al.: "WDM extended reach passive optical networks using OFDM-QAM," Optics Express, 16, pp. 12096-12101, Jul. 2008.

D. Qian et al.: "108 Gb/s OFDMA-PON with polarization multiplexing and direct-detection," Optical Fibre Communication/National Fibre Optic Engineers conf. (OFC/NFOEC) (OSA, 2009), Paper PDPD5.

H. Yang et al.: "40-Gb/s transmission over 100m graded-index plastic optical fiber based on discrete multitone modulation," Optical Fibre Communication/National Fibre Optic Engineers Conf. (OFC/NFOEC), (OSA, 2009), Paper PDPD8).

J. Tang, P.M. Lane and K.A. Shore, "Transmission Performance of Adaptively Modulated Optical OFDM Signals in Multimode Fiber Links," IEEE Photon. Technol. Lett, vol. 18, No. 1, pp. 205-207, 2006.

Tang et al., "High-speed transmission of adaptively modulated optical OFDM signals over multimode fibers using directly modulated DFBs," J. Lightw. Technol., vol. 24, No. 1,pp. 429-441, 2006.

J. Tang and K.A. Shore, "30-Gb/s Signal Transmission Over 40-km Directly Modulated DFB-Laser-Based Single-Mode-Fiber Links Without Optical Amplification and Dispersion Compensation," J. Lightw. Technol., vol. 24, No. 6, pp. 2318-2327, 2006.

J. Tang and K.A. Shore, "Maximizing the Transmission Performance of Adaptively Modulated Optical OFDM Signals in Multimode-Fiber Links by Optimizing Analog-to-Digital Converters," J. Lightw. Technol., vol. 25, No. 3, pp. 787-798, 2007.

* cited by examiner

SYNCHRONIZATION PROCESS IN OPTICAL FREQUENCY DIVISION MULTIPLEXING TRANSMISSION SYSTEMS

CROSS REFERENCE TO RELATED APPLICATIONS

This application is the U.S. national phase application of PCT International Application No. PCT/EP2010/066471 filed Oct. 29, 2010, which claims priority to Great Britain Patent Application No. GB 0919057.0 filed Oct. 30, 2009, and European Patent Application No. EP 10163169.5 filed May 18, 2010, the contents of each being incorporated by reference in their entirety.

BACKGROUND OF THE INVENTION

1. Field of the Invention

The present invention relates to the field of signal transmission using optical orthogonal frequency division multiplexing (OOFDM) transceivers and to a synchronisation method for improving the receiving process.

2. Description of the Related Art

It is known to use optical orthogonal frequency division multiplexing (OFDM) modulation technique in order to reduce optical modal dispersion in multimode fibre (MMF) transmission links, as disclosed for example in Jolley et al. (N. E. Jolley, H. Kee, R. Richard, J. Tang, K. Cordina, presented at the National Fibre Optical Fibre Engineers Conf., Annaheim, Calif., Mar. 11, 2005, Paper OFP3). It offers the advantages of great resistance to dispersion impairments, efficient use of channel spectral characteristics, cost-effectiveness due to full use of mature digital signal processing (DSP), dynamic provision of hybrid bandwidth allocation in both the frequency and time domains, and significant reduction in optical network complexity.

It can also be used advantageously for dispersion compensation and spectral efficiency in single mode fibre (SMF)-based long distance transmission systems such as described for example by Lowery et al. (A. J. Lowery, L. Du, J. Armstrong, presented at the National Fibre Optical Fibre Engineers Conf., Annaheim, Calif., Mar. 5, 2006, paper PDP39) or by Djordjevic and Vasic (I. B. Djordjevic and B. Vasic, in Opt. express, 14, no 9, 37673775, 2006).

The transmission performances of OOFDM have been studied and reported for all the optical network scenarios including long-haul systems such as described for example in Masuda et al. (H. Masuda, E. Yamazaki, A. Sano, T. Yoshimatsu, T. Kobayashi, E. Yoshida, Y. Miyamoto, S. Matsuoka, Y. Takatori, M. Mizoguchi, K. Okada, K. Hagimoto, T. Yamada, and S. Kamei, "13.5-Tb/s (135×111-Gb/s/ch) no-guard-interval coherent OFDM transmission over 6248 km using SNR maximized second-order DRA in the extended L-band," Optical Fibre Communication/National Fibre Optic Engineers Conference (OFC/NFOEC), (OSA, 2009), Paper PDPB5) or in Schmidt et al. (B. J. C. Schmidt, Z. Zan, L. B. Du, and A. J. Lowery, "100 Gbit/s transmission using single-band direct-detection optical OFDM," Optical Fibre Communication/National Fibre Optic Engineers Conference (OFC/NFOEC), (OSA, 2009), Paper PDPC3) or metropolitan area networks such as described for example in Duong et al. (T. Duong, N. Genay, P. Chanclou, B. Charbonnier, A. Pizzinat, and R. Brenot, "Experimental demonstration of 10 Gbit/s for upstream transmission by remote modulation of 1 GHz RSOA using Adaptively Modulated Optical OFDM for WDM-PON single fiber architecture," European Conference on Optical Communication (ECOC), (Brussels, Belgium, 2008), PD paper Th.3.F.1) or in Chow et al. (C.-W. Chow, C.-H. Yeh, C.-H. Wang, F.-Y. Shih, C.-L. Pan and S. Chi, "WDM extended reach passive optical networks using OFDM-QAM," Optics Express, 16, 12096-12101, July 2008), or local area networks such as described for example in Qian et al. (D. Qian, N. Cvijetic, J. Hu, and T. Wang, "108 Gb/s OFDMA-PON with polarization multiplexing and direct-detection," Optical Fibre Communication/National Fibre Optic Engineers Conference (OFC/NFOEC), (OSA, 2009), Paper PDPD5) or in Yang et al. (H. Yang, S. C. J. Lee, E. Tangdiongga, F. Breyer, S. Randel, and A. M. J. Koonen, "40-Gb/s transmission over 100 m graded-index plastic optical fibre based on discrete multitone modulation," Optical Fibre Communication/National Fibre Optic Engineers Conference (OFC/NFOEC), (OSA, 2009), Paper PDPD8).

All prior art existing systems were based on transmission of OOFDM signals originating from arbitrary waveform generators (AWG) using off-line signal processing-generated waveforms. At the receiver, the transmitted OOFDM signals were captured by digital storage oscilloscopes (DSO) and the captured OOFDM symbols were processed off-line to recover the received data. Such off-line signal processing approaches did not consider the limitations imposed by the precision and speed of practical DSP hardware that are required for insuring real-time transmission.

Other work, described for example in WO98/19410 or EP-A-840485, or U.S. Pat. No. 5,953,311 disclosed a method for determining the boundaries of guard intervals of data symbols received in a coded orthogonal frequency division multiplexed (OFDM) signal. In that method, temporal signals separated by an interval of an active interval of a data symbol were associated in pairs and difference signals obtained. The dispersion of a first and second comparison blocks of difference signal were compared wherein the second comparison block was displaced from the first comparison block by n samples.

U.S. Pat. No. 6,359,938 and US2003/0142764 disclosed a single chip implementation of a digital receiver for multicarrier signals transmitted by OFDM. It included an improved FFT window synchronisation circuit coupled to the re-sampling circuit for locating the boundary of the guard interval transmitted with the active frame of the signal.

In US2004/0208269, the synchronisation in the receiver was carried out by separately taking into account both the amplitude and phase differences, thereby providing a clear distinction between the periods during which guard period samples are process and those during which they are not.

In U.S. Pat. No. 5,555,833, the signals were formatted in symbol blocks wherein each block comprised redundant information. It also included means for delaying the symbol blocks and for subtracting said delayed symbol block from the corresponding symbol block. The difference signal was then used to control a loop comprising a local oscillator operating at the clock frequency.

EP-A-1296493 disclosed a synchronisation apparatus that comprised
  a) a signal magnitude calculator for calculating the magnitude of an applied input complex signal during time T1;
  b) a first delay unit for delaying the signal received from the calculator;
  c) a first adding unit for subtracting delayed signal b) from input complex signal;
  d) an absolute value calculator applied to the difference of c) to provide absolute value signal;
  e) a second delay unit for delaying absolute value signal d)

f) a second adding unit for subtracting delayed signal e) from absolute value signal d);

g) a moving window sum unit for calculating the sum of the signals received during time T2;

h) a searching unit for comparing values of the accumulating unit during time T1 and searching for predetermined point;

i) a guard interval removing unit using searched position h).

In GB-A-2353680, synchronisation was achieved using a frame synchronisation pulse generated by deriving absolute values of successive complex samples of the OFDM symbol, determining the difference between these values and other values separated by a period representing the useful part of the OFDM symbol, integrating the differences over a plurality of symbols and determining the sample position of the point at which said integrated difference values changed substantially.

US2005/0276340 detected the symbol boundary timing in the receiver of a multicarrier system by:
receiving a series of received training signals over a wire-based channel;
storing at least 3 of these series to a buffer;
determining difference values for a pair of consecutive received training signals stored in the buffer;
selecting one of the difference values;
determining the received symbol boundary timing based on the selected difference value.

The known systems have been improved by introducing signal modulation technique known as adaptively modulated optical OFDM (AMOOFDM), offering advantages such as:
flexibility, robustness and optimal transmission performance;
efficient use of spectral characteristics of transmission links; individual subcarriers within a symbol can be modified according to needs in the frequency domain;
use of existing multimode fibres;
low installation and maintenance cost.

These have been described and discussed for example in Tang et al. (J. Tang, P. M. Lane and K. A. Shore in IEEE Photon. Technol. Lett, 18, no 1, 205-207, 2006 and in J. Lightw. Technol., 24, no 1, 429-441, 2006) or in Tang and Shore (J. Tang and K. A. Shore, in J. Lightw. Technol., 24, no 6, 2318-2327, 2006). Additional aspects such as
the impact of signal quantisation and clipping effect related to analogue to digital conversion (ADC) and determination of optimal ADC parameters;
maximisation of transmission performance;
have been described in Tang and Shore (J. Tang and K. A. Shore, in J. Lightw. Technol., 25, no 3, 787-798, 2007).

In order to implement real-time OOFDM transceivers, there is a need to develop advanced high-speed signal processing algorithms with adequate complexity.

SUMMARY OF THE INVENTION

It is an objective of the invention to correct the symbol timing offset induced by the time delay of the transmission link.

It is also an objective of the present invention to correct the sampling clock offset induced by the clock mismatch between transmitter and receiver, or by time domain expansion of the received signal caused by fibre and/or laser effects.

It is another objective of the present invention to improve the tolerance to changes in transmission link conditions.

It is yet another objective of the present invention to increase the processing speed.

It is also an objective of the present invention to improve the tolerance to noise.

In accordance with the present invention, the foregoing objectives are realised as defined in the independent claims. Preferred embodiments are defined in the dependent claims.

DESCRIPTION OF THE PREFERRED EMBODIMENTS

Figure 1:
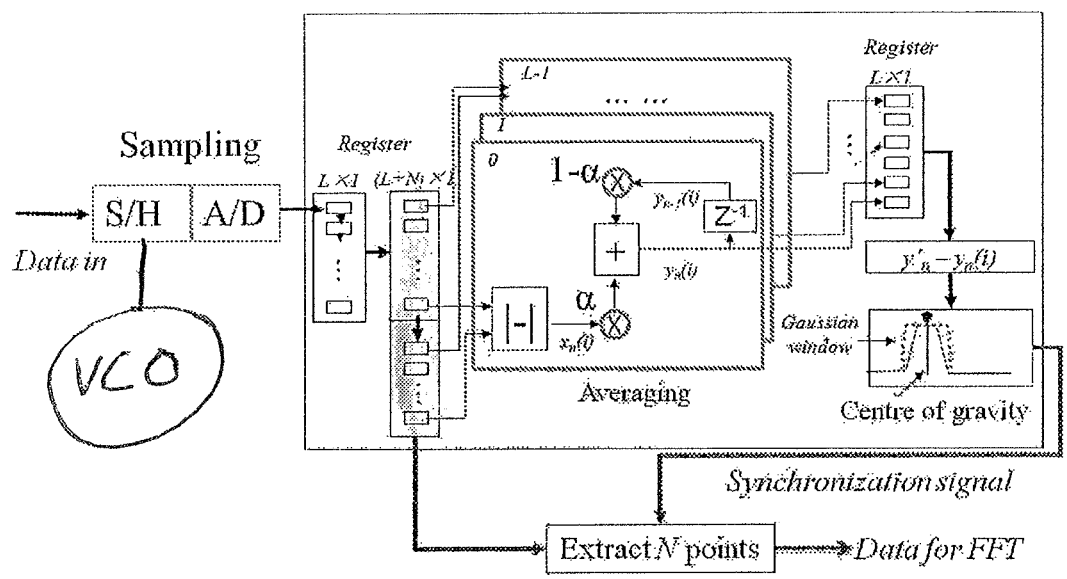
FIG. 1 represents a diagram of the synchronisation system used at the reception end of the transceiver.

The present invention discloses a symbol synchronisation method in the receiving part of an OOFDM transceiver, as represented in FIG. 1, that comprises the steps of;

a) converting the incoming real-valued samples from serial to parallel into two OFDM symbol groups wherein one group contains an original copy of the symbols and the other group contains a time-delayed copy of the symbols;

b) performing a first subtraction operation between sample at position x of the original symbol copy and sample at position x+N−L of the time-delayed copy wherein N is the total number of samples and L is the length of a cyclic prefix;

c) storing the absolute value of the subtraction in position x of a synchronisation register;

d) performing a next subtraction operation between sample at position x+1 of the original symbol copy and sample at position x+1+N−L of its time-delayed copy counterpart;

e) storing the absolute value of the subtraction in position x+1 of the synchronisation register;

f) repeating the subtraction operation until x=N and selecting the subsequent sample as x=1;

g) when the synchronisation register is full, reallocating each slot of the synchronisation register with subsequent round of subtractions wherein random noise and inter-symbol interference is minimised by averaging each new value with the value stored previously using equation $y(n)=\alpha \cdot x(n)+(1-\alpha) \cdot y(n-1)$ wherein $\alpha$ is a coefficient controlling the growth of the calculated value, $y(n-1)$ is the synchronisation vector previously stored in the synchronisation register and $x(n)$ is the new synchronisation vector;

h) repeating the operation over many blocks of N symbols to generate a clean synchronisation profile;

i) inverting the synchronisation profile in order to generate a window;

j) calculating the centre of gravity of the window in order to determine the synchronisation signal position;

k) convolving the window of step j) with a Gaussian window having its centre positioned at the position of the synchronisation signal;

l) activating a voltage controlled oscillator (VCO) in order to activate a sampling clock at the input of the receiver;

m) correcting the clock offset.

The voltage controlled oscillator is an electronic oscillator that is controlled in oscillation frequency by a voltage input: it is used as clock generator. It provides a timing signal to synchronise operations in digital circuits. Design parameters for voltage controlled crystal oscillators VCXO clock generator are tuning voltage range, center frequency, frequency tuning range and the timing jitter of the output signal. Jitter must be minimised. The tuning range of a VCXO is typically a few ppm (parts per million) corresponding to a control voltage range of typically 0 to 3 volts.

Any transmitter available in the field can be used with the receiver of the present invention.

In a preferred embodiment according to the present invention, transmitter doubles the transmission capacity of an optical orthogonal frequency division multiplexing (OOFDM) transceiver by using both the real and imaginary parts of the inverse fast Fourier transform to convey information related to two signals.

In the most preferred embodiment, it further uses a semiconductor amplifier for generating the optical waveform.

This most preferred double capacity transmitter is disclosed in detail in two co-pending applications filed on the same date as the present application. It comprises the steps of:

a) encoding the incoming binary data sequence into serial complex numbers using different signal modulation formats;

b) applying a serial to parallel converter to the encoded complex data;

c) generating a sum of two individual sets of 2N parallel data, $\{A\}$ and $\{B\}$ wherein $\{A\}$ and $\{B\}$ satisfy the relationships $A_{2N-n}=A^*_n$ and $B_{2N-n}=B^*_n$ for n ranging from 1 to 2N−1, A* and B* being respectively the complex conjugates of A and B, and wherein $\{A\}$ and $\{B\}$ also satisfy the relationships $\mathrm{Im}\{A_0\}=\mathrm{Im}\{A_N\}=\mathrm{Im}\{B_0\}=\mathrm{Im}\{B_N\}=0$ d) applying the inverse of a time to frequency domain transform, to the sum of 2 sets of sub-carriers using field programmable gate array (FPGA)-based transform logic function algorithms in order to generate parallel complex OFDM symbols wherein the k-th symbol can be expressed as $$S_k^{A+B}(t) = \sum_{n=0 \text{ to } 2N-1} A_k \exp(i2\pi n\Delta ft) + \sum_{n=0 \text{ to } 2N-1} B_k \exp(i2\pi n\Delta ft)$$
$$= I_{k\_A}(t) + iQ_{k\_B}(t)$$

wherein $\Delta f$ is the frequency spacing between adjacent subcarriers and wherein I and Q represent respectively the in-phase component and the quadrature component;

e) inserting a prefix in front of each symbol of step d), said prefix being a copy of the end portion of the symbol;

f) serialising these symbols in order to produce a long digital sequence;

g) applying two digital to analogue converters to convert the real and imaginary parts of the digital sequence into analogue waveforms;

h) passing through the semiconductor amplifier system to generate an optical waveform;

i) optionally passing through an optical attenuator;

j) coupling the optical signal into a single mode fibre (SMF) or multimode fibre (MMF) or polymer optical fibre (POF) link;

k) optionally applying an optical filter said method being characterised in that, in the transmitter, two complex signals $A_k$ and $B_k$ are input into the inverse transform A cyclic prefix is introduced in the transmission part of the process as described hereabove.

The various components of the FPGA are described in detail in a co-pending application filed on the same date as the present application: they will be summarised here.

The signal modulation formats are those typically used in the field and are described for example in Tang et al. (Tang J. M., Lane P. M., Shore A., in Journal of Lightwave Technology, 24, 429, 2006.). The signal modulation formats vary from differential binary phase shift keying (DBPSK), differential quadrature phase shift keying (DQPSK) and $2^p$ quadratic amplitude modulation (QAM) wherein p ranges between 3 and 8, preferably between 4 and 6. The information is thus compressed thereby allowing reduction of the bandwidth.

The serial to parallel converter truncates the encoded complex data sequence into a large number of sets of closely and equally spaced narrow-band data, the sub-carriers, wherein each set contains the same number of sub-carriers 2N wherein N ranges between 8 and 256.

Discrete or fast Fourier transforms (DFT or FFT) are typically used in the field. Preferably FFT is used as it reduces significantly the computational complexity, which however remains very computationally demanding. $2^p$ point IFFT/FFT logic function wherein p is an integer ranging from 4 to 8 is preferably used in the present invention.

The analogue to digital converter (ADC) is an electronic device that converts a continuous analogue signal to a flow of digital values proportional to the magnitude of the incoming signal.

The optical fibres used in the present invention can be selected from single mode, multimode or polymer optical fibres.

Single mode optical fibres (SMF) are designed to carry only a single ray of light. They do not exhibit modal dispersion resulting from multiple spatial modes and thus retain the fidelity of each light pulse over long distances. They are characterised by a high bandwidth. They can span tens of kilometers at 1 Tb/s.

Multimode optical fibres (MMF) are mostly used for communication over shorter distances. Typical multimode links have data rates of 10 Mb/s to 10 Gb/s over link lengths of up to 600 meters. They have a higher light gathering capacity than SMF but their limit on speed times distance is lower than that of SMF. They have a larger core size than SMF and can thus support more than one propagation mode. They are however limited by modal dispersion, resulting in higher pulse spreading rates than SMF thereby limiting their information transmission capacity. They are described by their core and cladding diameters.

Polymer optical fibres (POF) are made of plastic such polymethylmethacrylate (PMMA) or perfluoribated polymers for the core and fluorinated polymers for the cladding. In large-diameter fibres, the core, allowing light transmission, represents 96% of the cross section. Their key features are cost efficiency and high resistance to bending loss.

The length of the cyclic prefix copied in front of the symbol is determined in order to obtain a ratio (length of cyclic prefix)/(total length of symbol) ranging between 5% and 40%.

In the subtraction process, if sample x is located in the cyclic prefix, the amplitude at sample x is very similar to that at sample x+N−L and the subtraction is thus about zero. Slight differences may occur from symbol to symbol, because of random noise and inter signal interference (ISI) effect. Subtraction operation however effectively minimises noise and ISI effect.

On the contrary, if sample x does not belong to the cyclic prefix region, there exists a random amplitude difference between sample at x and sample at x+N−L. After the subtraction operation, the calculated result maintains random amplitude, which vary from sample to sample and from symbol to symbol.

The optimal value of parameter α depends upon the level of noise of the system, the bigger the noise, the bigger α, or the more weight to the present measurement as compared to the previous measurement. Parameter α is determined by varying it until the synchronisation profile has a stable and fairly symmetrical shape. It depends upon the system in place. Preferably, α ranges between $10^{-2}$ and $10^{-3}$ for a stable system.

Figure 2:
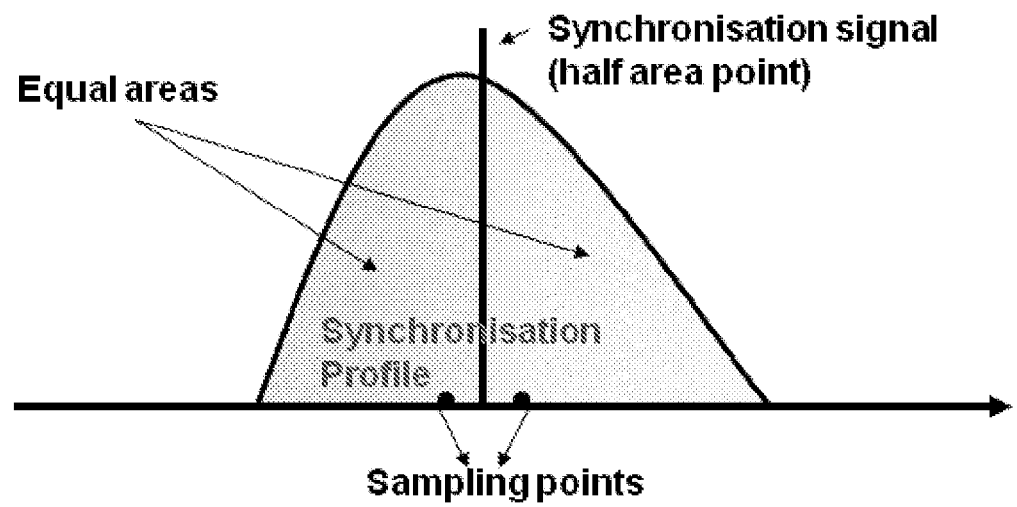
FIG. 2 represents a synchronisation profile resulting from the convolution of a theoretical square profile with the impulse response of the transmission system.

The generated synchronisation profile reproduces the position of the cyclic prefix and is theoretically a square profile. In real transmission links, the synchronisation profile is the convolution of said theoretical square profile with the impulse response of transmission system as represented in FIG. 2.

The synchronisation signal position is determined as the position that divides the synchronisation profile into two equal areas. It is typically an integer sample number accompanied by a fraction indicating a sampling phase error. The integer part of the synchronisation signal therefore indicates the beginning of the transform window whereas the fraction part of the signal is used to adjust the phase of the sampling clock by feeding the sampling phase error into the voltage controlled oscillator.

Gaussian window having its centre positioned at that of the synchronisation signal is then convolved with said signal.

The preferred width of the Gaussian window is of from 1 to 1.6 times wider than the selected prefix length, preferably about 1.3 times wider.

The voltage of the VCO is determined by the difference between the measured sampling points and the theoretical determination of the synchronisation signal in the synchronisation profile represented in FIG. 2. The signal is amplified to a few watts in order to make it suitable for VCO voltage which is of less than 1 volt.

This method offers several technical advantages:
- it reduces the susceptibility of OFDM to variations in transmission link conditions because efficient windowing blocks unwanted contribution from noise located outside the window, thereby making the synchronisation profile more distinguishable;
- it reduces the number of 'training' signals required to efficiently recognise the incoming signal from 10,000 symbols in conventional systems to at most 500 symbols, preferably at most 300 symbols in the present invention;
- it suppresses the noise level outside the prefix region in the synchronisation profile by averaging;
- it shortens the period of time necessary to compensate the sampling clock offset by at least one order of magnitude with respect to conventional methods. The time necessary to compensate the sampling clock offset in the present invention is of at most $10^{-5}$ s.

As compared to the prior art techniques typically used, such as described for example in WO98/19410, or in EP-A-0840485, or in U.S. Pat. No. 5,953,311, the present invention offers the important advantages of working in the high-speed optical transmission domain and not in the wireless domain. The present system is therefore not limited to bit rates of less than 100 Mb/s. It has been evaluated experimentally at bit rates of up to 12 Gb/s, but can work at much higher operating speeds (>40 Gb/s). In addition, the prior art systems use sophisticated special designs to synchronise the clock signal in the receiver. Such special designs are however, not required in the present invention as it uses a generated synchronisation signal to control the clock in the receiver. As a consequence, the receiver of the present system is more stable and allows a simpler design than that of the prior art. Also, the prior art synchronisation systems are based on the subtraction of two parallel signals, whereas the present system uses a number of parallel signals larger than the total number of samples per symbol. This, combined with Gaussian windowing allows the system to operate at much higher speeds. Finally, in comparison with conventional synchronisation techniques, the present invention can reduce the number of digital signal processing operations by a factor of approximately 3. This reduction factor can be further increased when the effects of symbol timing offset and sampling clock offset are considered.

EXAMPLES

Figure 3:
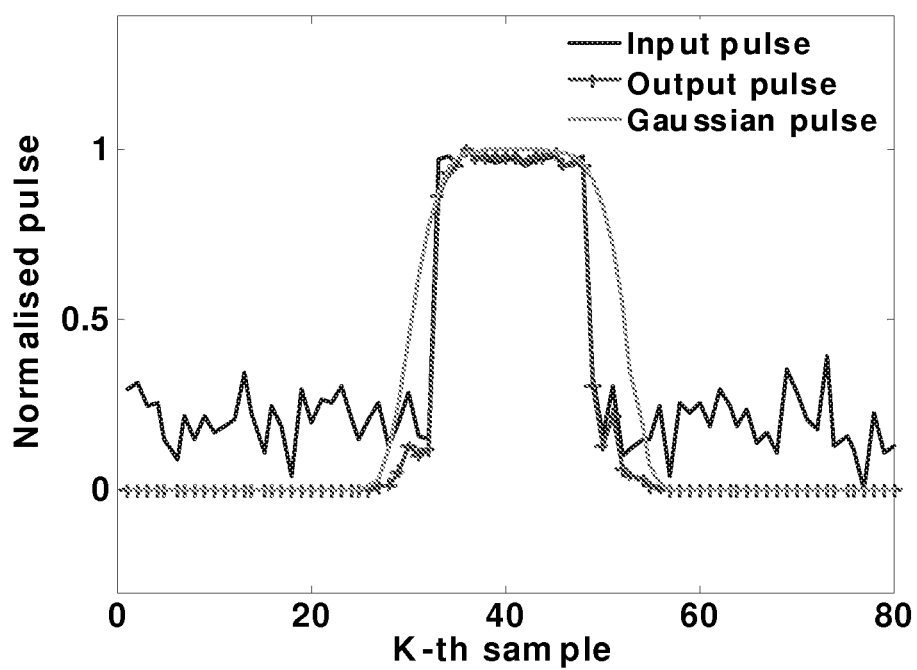
FIG. 3 represents a comparison of the subtraction operation with and without Gaussian windowing.
Figure 4:
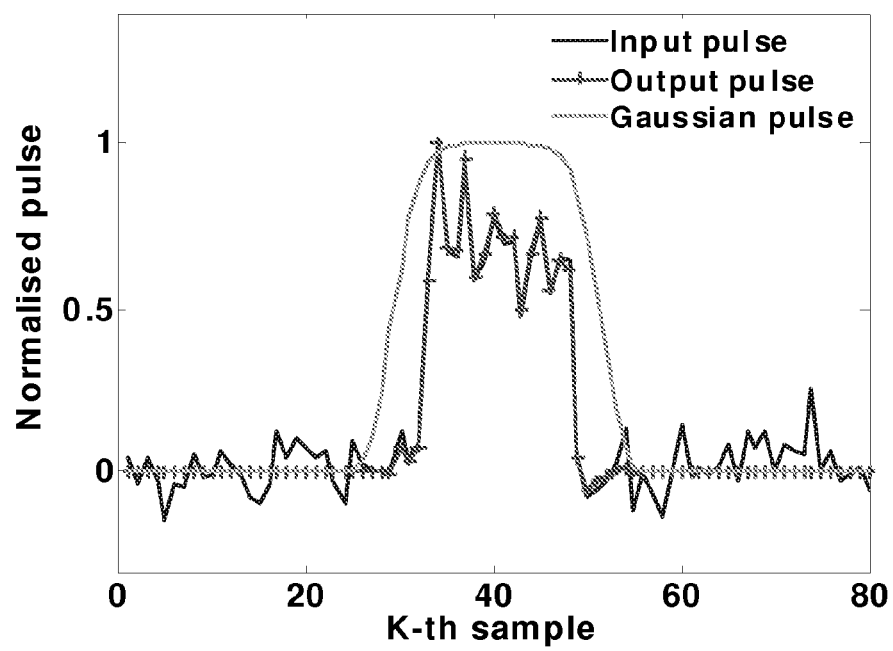
FIG. 4 represents a comparison of the multiplication operation with and without Gaussian windowing.
Figure 5:
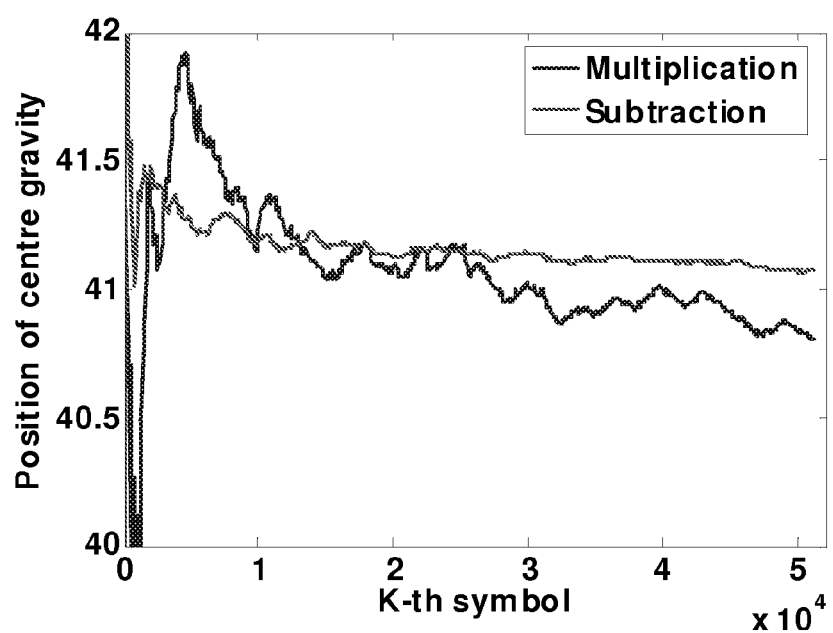
FIG. 5 represents a comparison of the number of samples necessary to establish the position of the centre of gravity of the synchronisation profile using the subtraction and multiplication operations.

Gaussian windowing is very efficient as indicated in FIG. 3 exhibiting a comparison between the subtraction produced synchronisation profiles with and without Gaussian windowing. Subtraction operation is more efficient than multiplication operation as evidenced from a comparison between FIGS. 3 and 4. FIG. 5 further shows that the subtraction method provides a significant reduction in length of 'training' data when compared to the multiplication method. A stable central gravity position is obtained at least 3 times faster, preferably at least 4 times faster for the subtraction method than for the multiplication method.

Based on the end-to-end real-time OOFDM transceiver architecture and component/system parameters presented hereabove, the symbol synchronisation technique according to the present invention was carried out in directly modulated DFB laser (DML)-based 25 km MetroCor single mode fibre (SMF) intensity modulation and direct detection (IMDD) links operating at different signal bit rates of up to 6.56 Gb/s. The sampling rate of ADC/DAC was 2GS/s. The symbol length was L=40 samples or 20 ns, and the cyclic prefix length was 8 samples or 4 ns. The symbol timing offset (STO) effect was highlighted by using clock synthesisers based on a common reference clock in order to generate the system clocks for both the transmitter and receiver.

Figure 6:
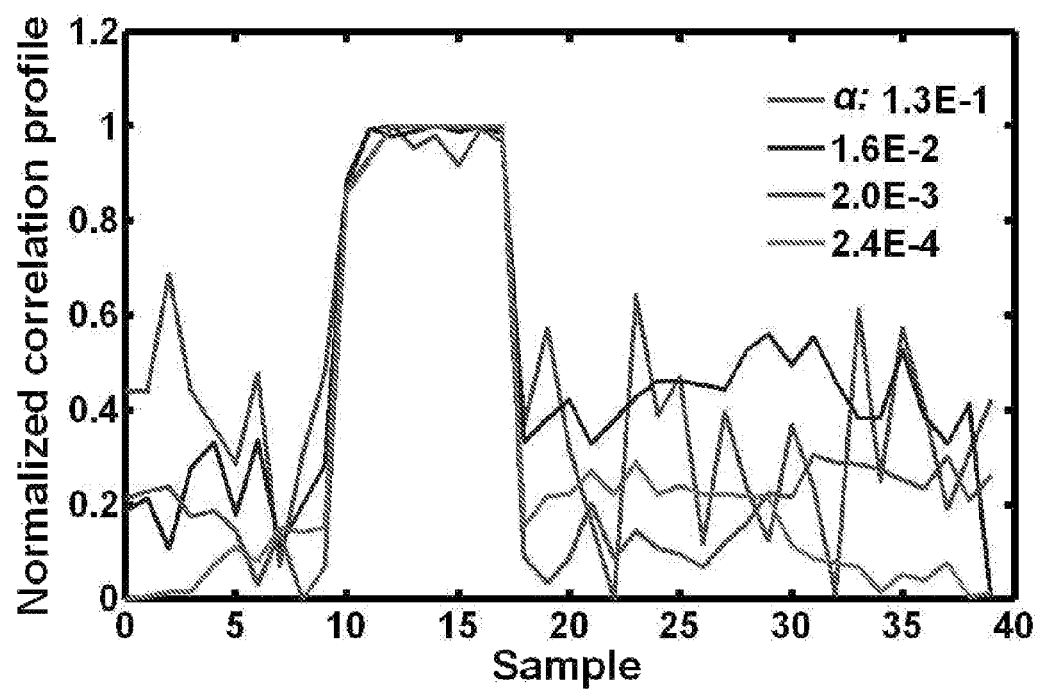
FIG. 6 represents normalised synchronisation profiles before Gaussian windowing.
Figure 7:
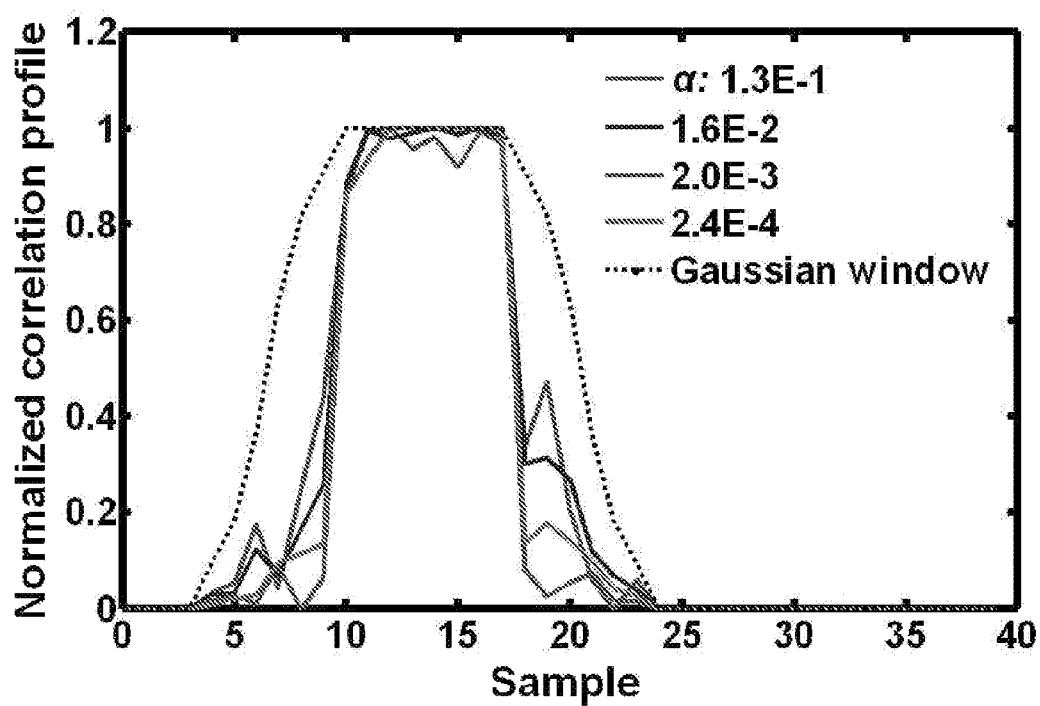
FIG. 7 represents normalised synchronisation profiles after Gaussian windowing.

The importance of Gaussian windowing in improving the centre of gravity (COG) accuracy was investigated for several values of coefficient α. The results are plotted in FIGS. 6 and 7 that show respectively the synchronisation profiles before and after applying Gaussian windowing measured after transmitting 25 km MetroCor SMFs. It was observed that the Gaussian windowing-enabled synchronisation profile was very clean over the cyclic prefix region. The random noise outside the profile decreased and the profile edges became sharper with decreasing values of coefficient α.

Figure 8:
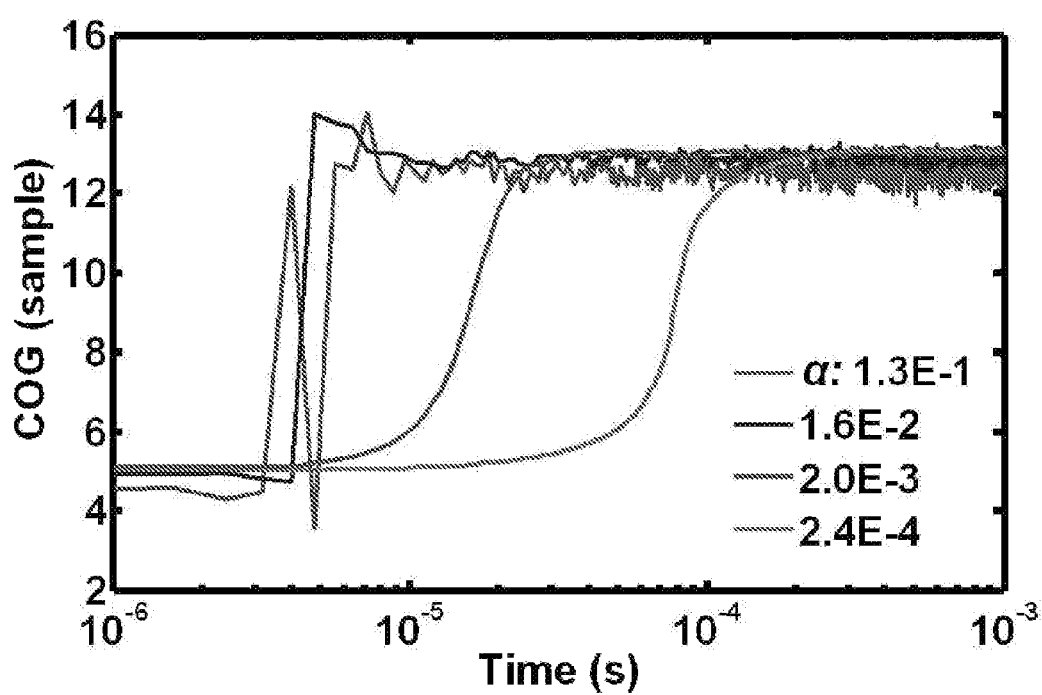
FIG. 8 represents dynamic centre of gravity (COG) evolution for a received optical power of −16 dBm as a function of time expressed in seconds for different values of coefficient $\alpha$.

FIG. 8 represents the dynamic processes of establishing a clean synchronisation profile and a stable COG. It was obtained by inserting an extra 8-sample delay into a normally running transmission system at a received optical power of −16 dBm. It can be seen in that figure that, for a small α, a long time period was required to stabilise the COG, but it had a very clean evolution curve. The tracking speed on the other hand increased with increasing α. When α increased from $2.4 \times 10^{-4}$ to $1.3 \times 10^{-1}$, the corresponding time period required for stabilising the COG decreased from $2 \times 10^{-4}$ to $8 \times 10^{-6}$ seconds, corresponding respectively to 10000 and 400 OOFDM symbol periods. The transmission performance of the real-time OOFDM transmission systems was measured with $\alpha = 2.0 \times 10^{-3}$ for best trade-off between accuracy and tracking speed.

Figure 9:
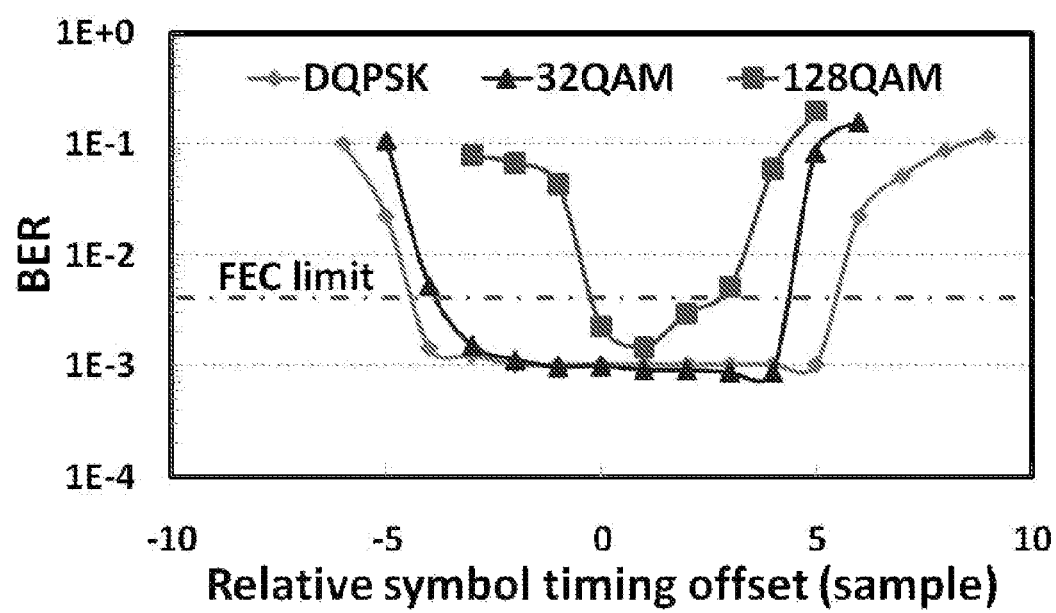
FIG. 9 represents the bit error rate (BER) performance as a function of relative symbol timing offset (STO) respectively for DQPSK, 32-QAM and 128-QAM encoded OOFDM signals.

The measured BER versus relative STO for different signal modulation format gave information on STO as can be seen in FIG. 9, where the zero relative STO corresponds to the integer part of the COG. At a BER of $10^{-3}$, the received optical powers for the DQPSK-, 32-QAM- and 128-QAM-encoded OOFDM signals were respectively of −21.0, −14.2 and −8.3 dB. The BER curves were almost symmetrical with respect to the zero relative STO. At such a point, for each signal modulation format considered, the lowest BER was achieved, indicating that the synchronisation technique efficiently compensated for the STO effect. For high modulation formats, the BER performance was more sensitive to STO. For achieving a specific BER, a high modulation format-encoded signal had a large signal to noise ratio (SNR), and was thus more susceptible to imperfect synchronisation-induced inter-symbol interference (ISI) effect.

Figure 10:
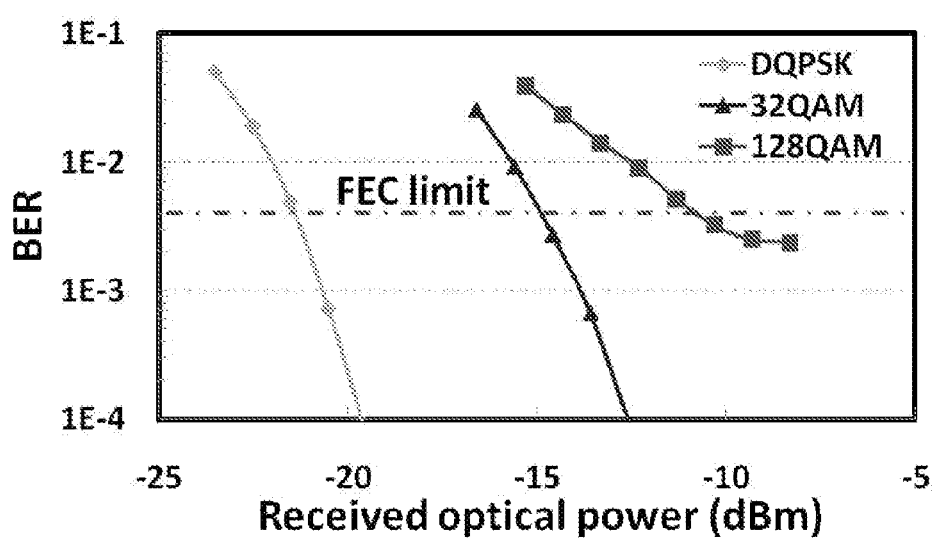
FIG. 10 represents the BER as a function of received optical power expressed in dBm respectively for DQPSK, 32-QAM and 128-QAM encoded OOFDM signals.

The accuracy of the proposed technique was tested by plotting the real-time OOFDM transmission performance over 25 km MetroCor SMF IMDD links in FIG. 10. It represents the BER as a function of received optical power for DQPSK-, 32-QAM- and 128-QAM-encoded OOFDM signals corresponding to raw signal bit rates respectively of 1.88 Gb/s, 4.69 Gb/s and 6.56 Gb/s. FIG. 10 shows that the minimum received optical powers required for achieving the forward error correction (FEC) BER limit were reduced to −21.5 dBm for DQPSK, to −15.0 dBm for 32-QAM and to −10.8 dBm for 128-QAM.

These system performances thus confirmed that the proposed synchronisation technique was highly accurate for use in different OOFDM systems.

Owing to system noise, the measured sample clock offset (SCO) variation was ±1 ppm, which was very close to the real SCO value of zero adopted in the experiments thereby confirming the excellent stability of the present synchronisation technique.

The invention claimed is:

1. A symbol synchronization method in a receiving part of an optical orthogonal frequency division multiplexing (OOFDM) transceiver that comprises the steps of:
    a) converting incoming real-valued samples from serial to parallel into two orthogonal frequency division multiplexing (OFDM) symbol groups wherein one group contains an original copy of the symbols and the other group contains a time-delayed copy of the symbols;
    b) performing a first subtraction operation between sample at position x of the original symbol copy and sample at position x+N−L of the time-delayed copy wherein N is the total number of samples and L is a length of a cyclic prefix;
    c) storing a first absolute value of the first subtraction in position x of a synchronization register;
    d) performing a next subtraction operation between sample at position x+1 x of the original symbol copy and sample at position x+1+N−L of its time-delayed copy counterpart;
    e) storing a next absolute value of the next subtraction in position x+1 of the synchronization register;
    f) repeating the subtraction operation until x=N and selecting a subsequent sample as x=1;
    g) when the synchronization register is full, reallocating each slot of the synchronization register with subsequent round of subtractions wherein random noise and inter-symbol interference is minimized by averaging each new value with the value stored previously using equation $y(n) = \alpha \cdot x(n) + (1-\alpha) \cdot y(n-1)$ wherein α is a coefficient controlling the growth of the calculated value, y(n−1) is a synchronization vector previously stored in the synchronization register and x(n) is a new synchronization vector;
    h) repeating the operation over at most 500 blocks of symbols as needed to generate a synchronization profile;
    i) inverting the synchronization profile in order to generate a window;
    j) calculating a centre of gravity of the window in order to determine a synchronization signal position;
    k) convolving the window of step j) with a Gaussian window having its centre positioned at the position of the synchronization signal.

2. The method of claim 1 wherein the number of samples N is $2^P$ wherein p is an integer ranging between 6 and 10.

3. The method of claim 1 wherein the cyclic prefix is selected to have a ratio (length of cyclic prefix)/(total length of a symbol) ranging between 5 and 40%.

4. The method of claim 1 wherein a ranges between $10^{-2}$ and $10^{-3}$.

5. The method of claim 1 wherein a number of 'training' signals necessary to recognize the incoming signal is of at most 300.

6. The method of claim 1 wherein the receiving part of an OOFDM transceiver comprises a voltage controlled oscillator (VCO) to activate a sampling clock at the input of the receiver for correcting a clock offset.

7. Use according to claim 6 wherein time to compensate the sampling clock offset is at most $10^{-5}$.

8. A receiver configured to perform the steps of claim 1.

9. A transceiver comprising the receiver of claim 8.

10. The transceiver of claim 9 wherein two individual symbol synchronization schemes are utilized for two signals of different wavelengths, which correspond to the real and imaginary parts of an inverse fast Fourier transform and convey information related to these two signals.

* * * * *

UNITED STATES PATENT AND TRADEMARK OFFICE
CERTIFICATE OF CORRECTION

| | | |
|---|---|---|
| PATENT NO. | : 8,938,171 B2 | Page 1 of 1 |
| APPLICATION NO. | : 13/504697 | |
| DATED | : January 20, 2015 | |
| INVENTOR(S) | : Jianming Tang and Xianqing Jin | |

It is certified that error appears in the above-identified patent and that said Letters Patent is hereby corrected as shown below:

On the Title Page, item (30) should be corrected and should read:

(30)   Foreign Application Priority Data

Oct. 30, 2009   (GB)   0919057.0
May 18, 2010   (EP)   10163169.5

In the Claims

Column 10, line 43, Claim 4, should corrected to read:

The method of claim 1 wherein $\alpha$ ranges between $10^{-2}$

Signed and Sealed this
Seventh Day of July, 2015

Michelle K. Lee
*Director of the United States Patent and Trademark Office*